United States Patent [19]

Lee

[11] 3,740,587

[45] June 19, 1973

[54] SOLID STATE UNIPOLE RELAY

[75] Inventor: Art Lee, El Paso, Ill.

[73] Assignee: General Electric Company, New York, N.Y.

[22] Filed: Sept. 20, 1971

[21] Appl. No.: 182,059

[52] U.S. Cl...... 307/252 B, 307/247 R, 307/252 N, 307/261, 307/289, 307/148.5 B, 328/62

[51] Int. Cl... H03k 17/72, H03k 3/295, H01h 47/32

[58] Field of Search............... 307/243, 244, 252 B, 307/252 N, 252 T, 252 W, 247 R, 276, 284, 260, 283, 289, 290, 291; 328/62, 68, 70, 71, 105, 152, 153; 317/148.5 B

[56] References Cited

UNITED STATES PATENTS

| | | | |
|---|---|---|---|
| 3,650,005 | 4/1972 | Lee | 307/252 B X |
| 3,210,562 | 10/1965 | Yoshizawa et al. | 307/290 X |
| 3,284,083 | 11/1966 | Levin et al. | 307/291 X |
| 3,453,599 | 7/1969 | Lester | 307/252 B X |
| 3,020,418 | 2/1962 | Emile, Jr. | 307/291 X |
| 2,997,665 | 8/1961 | Sylvan | 307/283 X |
| 3,281,810 | 10/1966 | Thornberg et al. | 307/284 X |
| 3,445,683 | 5/1969 | Traina | 307/252 W |
| 3,457,430 | 7/1969 | Samuelson | 307/252 W |
| 3,648,077 | 3/1972 | Evalds | 307/252 B |

OTHER PUBLICATIONS

G. E. SCR Manual, p.85–86, 4th Edition, 3/1967.

*Primary Examiner*—John W. Huckert
*Assistant Examiner*—L. N. Anagnos
*Attorney*—Arthur E. Fournier, Jr., Philip L. Schlamp and Frank L. Neuhauser et al.

[57] ABSTRACT

A solid state unipole relay, preferably for use in a modular system for providing solid state power control, comprising two discrete elements employable in different combinations to form a multipole relay with convertible contact functions and including a circuit which supplies two discrete output terminals with a train of pulses to enable gating of a Triac or Triacs associated with that particular output terminal, and wherein the operation of the circuit is such that during normal operation a train of pulses is applied to one output terminal which is connected, in turn, to an associated gate circuit of one or more Triacs but when a control signal is applied to an appropriate point within the circuit the first train of pulses is inhibited and a second train of pulses, fed to a second output terminal, is actuated to control the associated gate circuit of one or more Triacs that are independent of the first mentioned Triac or Triacs.

9 Claims, 6 Drawing Figures

INVENTOR
ART LEE

BY

ATTORNEY

Patented June 19, 1973 3,740,587

3 Sheets-Sheet 2

INVENTOR
ART LEE

BY Arthur E. Fournier Jr.
ATTORNEY

INVENTOR
ART LEE
BY [signature]
ATTORNEY

SOLID STATE UNIPOLE RELAY

BACKGROUND OF THE INVENTION

1. Field Of The Invention

My invention relates to solid state power control systems, and more particularly to an improvement in solid state relays of the type employed in such systems to form multipole relays with convertible contact functions.

2. Description Of The Prior Art

Although solid state relays have been employed in the prior art heretofore as part of solid state power control systems, the frequency with which such systems and thus solid state relays are finding a place in industry has been increasing rapidly in recent years. Apparently this stems at least in part to the fact that more recognition is being accorded to the desirable features inherently possessed by such solid state power control systems. Some of the more prominent advantages offered by such systems are their maximum reliability and long life. The latter results from the fact that solid state components do not contain moving parts which by virtue of being subject to wear, etc. have a limited life as compared to non-moving functionally similar components. In addition solid state power control systems tend normally to be of lighter weight and generally provide faster response times than do their predecessors, i.e., the previously available electrical or electromechanical devices. Also, the components in solid state systems are generally not as susceptible to being adversely affected by environmental contaminants as are other earlier available types of devices.

Notwithstanding the advantages possessed by solid state power control systems, the solid state relays known heretofore for use therein have been characterized by the fact that they possessed several limiting features. One such limiting feature for example resides in the maximum number of poles provided by any one such relay. Most commonly, such relays have been limited to a maximum of four poles. Another characteristic of prior art forms of solid state relays is that they have been limited in their current carrying capacity.

Another disadvantage of the prior art forms of solid state relays is that they are more difficult to apply in a given power control system inasmuch as they are limited in the manner in which they can be connected across line power. Finally, each given prior art solid state relay has heretofore conventionally been capable of performing only two logic sequences, i.e., the two sequences associated with the normally open (NO) and normally closed (NC) contact functions.

OBJECTS OF THE INVENTION

It is therefore an object of the present invention to provide a novel and improved solid state unipole relay for use in solid state power control systems which relay incorporates a building block approach whereby combinations of relay elements may be combined to form multipole relays having convertible contact functions.

It is another object of the present invention to provide such a solid state unipole relay for solid state power control systems wherein multipole relays are capable of being provided having a greater number of poles than the number heretofore possessed by prior art solid state relay devices.

A further object of the present invention is to provide such a solid state unipole relay for solid state power control systems wherein the relay is capable of carrying higher currents than carried by prior art solid state relay devices.

A still further object of the present invention is to provide such a solid state unipole relay for solid state power control systems wherein the relay by being capable of operating from either side of line power facilitates applying the relay in a given application.

Yet another object of the present invention is to provide such a solid state unipole relay for solid state power control systems which relay is capable of providing an additional logic sequence.

Yet a further object of the present invention is to provide such a solid state unipole relay for solid state power control systems wherein the relay is relatively easy to manufacture and assemble while yet providing long life and reliability in operation.

SUMMARY OF THE INVENTION

In accordance with a preferred form of the invention there is provided a solid state unipole relay for use in a modular, solid state, power control system. The solid state unipole relay comprises two discrete elements which are employable in different combinations to form a multipole relay having convertible contact functions. Further the solid state unipole relay includes a circuit which supplies two discrete output terminals with a train of pulses to enable gating of a Triac or Triacs associated with a particular output terminal. The operation of the circuit is such that during normal operation a train of pulses is applied to one output terminal which is connected in turn to an associated gate circuit of one or more Triacs. However when a control signal is applied to an appropriate point within the circuit the first train of pulses is inhibited and a second train of pulses, fed to a second output terminal, is actuated to control the associated gate circuit of one or more Triacs that are independent of the first mentioned Triac or Triacs.

The invention will be more fully understood from the following detailed description and its scope will be pointed out in the appended claims.

DESCRIPTION OF A PREFERRED EMBODIMENT

Figure 1:
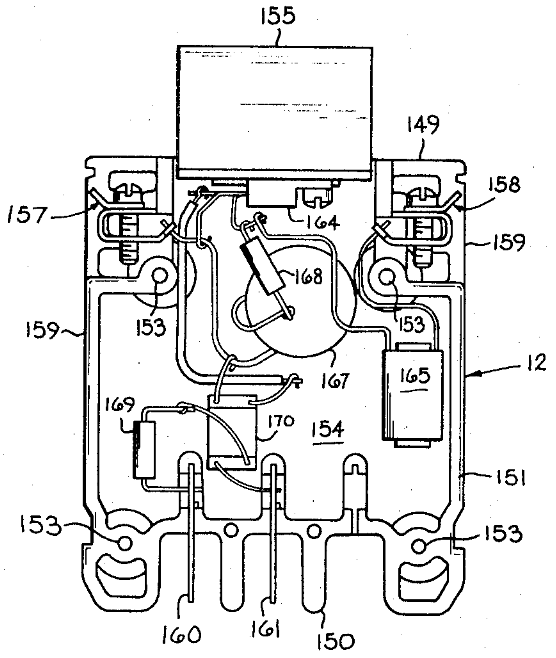
FIG. 1 is a front view of a power pole of a solid state unipole relay for use in a modular, solid state, power control system in accordance with the present invention, illustrated with one side wall removed in order to show the interior of the power pole.

The solid state unipole relay in accordance with the present invention comprises two discrete elements 11 and 12 which may be utilized in different combinations to form a multipole relay with convertible contact functions. More specifically, the aforesaid two elements comprise a driver unit 11 and a power pole 12. In addition, as will be described more fully hereinafter the driver unit 11 may take the form of either a standard driver unit 13 or an electrically latched driver unit 14. The standard driver unit 13 will be described first and the modification for electrical latching will then be delineated.

Figure 4:
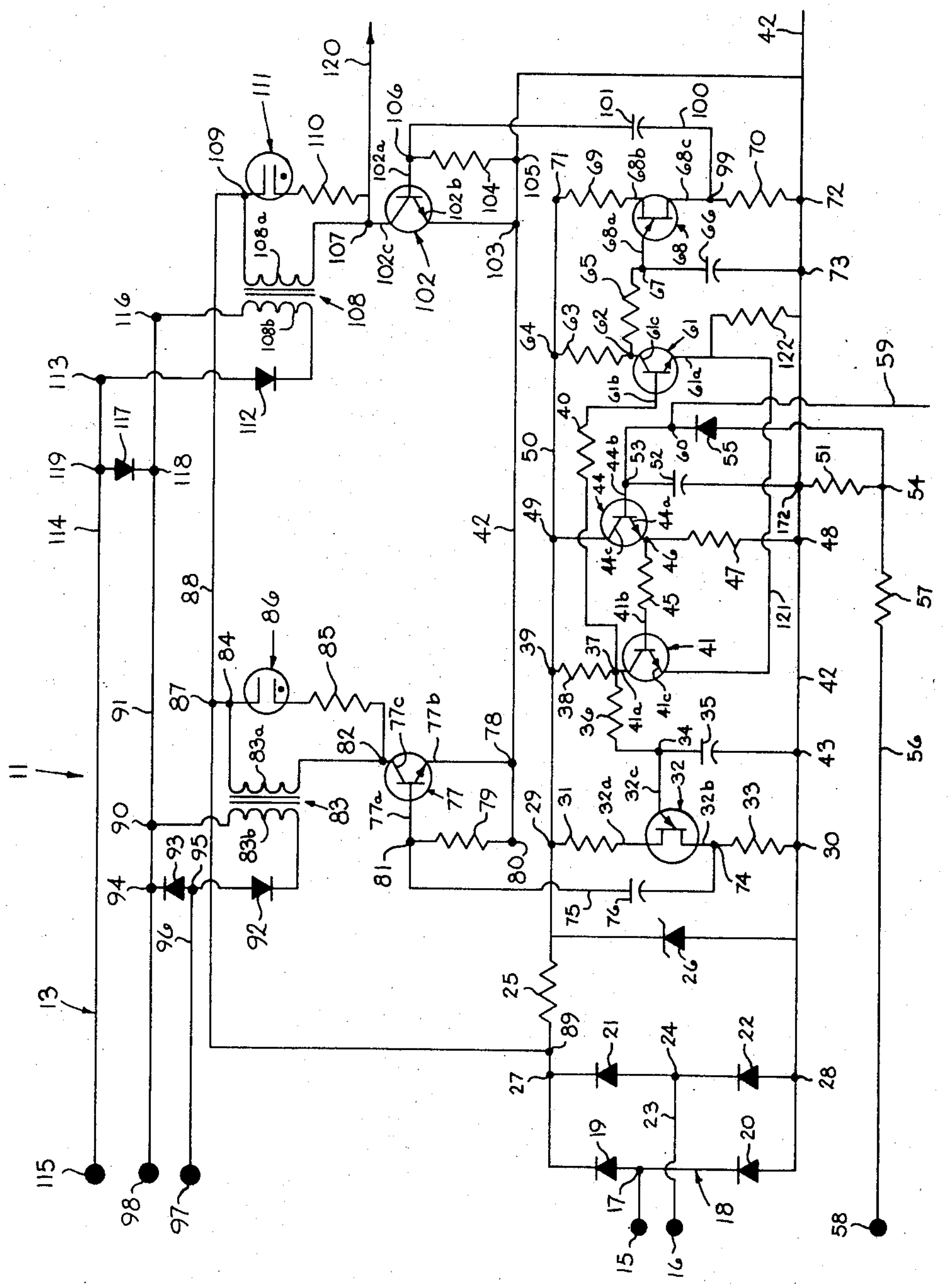
FIG. 4 is a schematic diagram of the circuitry for the driver unit of a solid state unipole relay for use in a modular, solid state, power control system in accordance with the present invention.

Referring to FIG. 4 of the drawing, there is illustrated therein the circuitry of the standard driver unit 13. Turning now to a description thereof, line power for the circuit is applied across terminals 15 and 16. This power is preferably taken from an alternating current (A.C.) source. Terminal 15 is connected to an input terminal 17 of a full wave bridge rectifier 18 comprising diodes 19, 20, 21 and 22. Terminal 16 is connected through lead 23 to input terminal 24 of full wave bridge rectifier 18. Thus, the A.C. line power is applied across the input terminals 15 and 16 to the full wave bridge rectifier 18 to form pulsating D.C. The latter as will be described more fully hereinafter is then applied to the logic control portion of the circuit through resistor 25 and Zener diode 26 which are connected across the output terminals 27 and 28 of the full wave bridge rectifier 18. The Zener diode 26 functions to clip the pulsating D.C. to trapezoidal shape.

With regard to the aforementioned logic control portion of the circuit, resistor 25 and Zener diode 26 are connected to terminals 29 and 30 to which are serially connected resistor 31, the bases 32*a* and 32*b* of unijunction transistor (UJT) 32, and resistor 33. The emitter 32*c* of UJT 32 is connected to the junction 34 of timing capacitor 35 and resistor 36. Timing capacitor 35 is connected to lead 42 through terminal 43 while the other end of resistor 36 is connected to the junction 37. As seen with reference to FIG. 4, the resistor 38 is connected between terminal 39 and junction 37. Junction 37 also serves as a connecting point for resistor 40 and the collector 41*a* of transistor 41. The base 41*b* of transistor 41 is connected to emitter 44*a* of transistor 44 through resistor 45 and junction 46. The emitter 44*a* of transistor 44 is also connected through junction 46 to resistor 47 and terminal 48 and thereby to lead 42. In addition, transistor 44 has its collector 44*c* connected to terminal 49 and thereby to lead 50.

Proceeding further with a description of the logic control portion of the circuitry of the driver unit 13, resistor 51 is connected between terminal 54 and terminal 172. Capacitor 52 is connected between terminal 53 and terminal 172. Diode 55 is connected across terminals 53 and 54 and thereby to the base 44*b* of transistor 44 and to lead 56. The latter serves to interconnect through resistor 57 transistor 44 and terminal 58 which is provided for a purpose to be more fully described hereinafter. Diode 55 is also connected to lead 59 through junction 60.

In accord with the circuit depicted in FIG. 4, transistor 44 is connected to transistor 61. More specifically, the emitters 41*c* and 61*a* of transistors 41 and 61, respectively, are interconnected through lead 121 while the base 61*b* of transistor 61 is connected through previously described resistor 40 and junction 37 to the collector 41*a* of transistor 41. The collector 61*c* of transistor 61 is connected to junction 62 and thereby to one end of resistor 63. The other end of resistor 63 is connected to lead 50 through terminal 64. Junction 62 also serves to connect the collector 61*c* of transistor 61 to resistor 65, capacitor 66, and through terminal 73 to lead 42. In addition the collector 61*c* of transistor 61 is connected through junction 67 to the emitter 68*a* of unijunction transistor (UJT)68. The bases 68*b* and 68*c* of UJT 68 are serially connected to resistors 69 and 70 with the latter in turn being connected through terminals 71 and 72 to leads 50 and 42, respectively. Resistor 122 is connected between leads 42 and 121.

Referring now once again to the first described UJT, i.e., UJT 32, base 32*b* thereof is connected to junction 74 to which in turn is connected lead 75. Lead 75 thus serves to interconnect base 32*b* of UJT 32 to capacitor 76 and to the base 77*a* of transistor 77. Transistor 77 has its emitter 77*b* connected through terminal 78 to previously described lead 42. Further as can be seen with reference to FIG. 4, resistor 79 is connected between lead 42 and lead 75 by means of terminals 80 and 81, respectively. The collector 77*c* of transistor 77 is connected through junction 82 to a first winding 83*a* of transformer 83. In addition, first winding 83*a* of transformer 83 has connected thereacross between junction 82 and terminal 84, resistor 85 and neon lamp 86 which are serially interconnected. The other side of neon lamp 86 is connected through terminals 84 and 87 to lead 88 and therethrough to terminal 89 and lead 50. The second winding 83*b* of transformer 83 has one side connected through terminal 90 to lead 91 while the other side thereof is connected to a pair of serially connected diodes 92 and 93 which in turn are also connected to lead 91 by means of terminal 94 and thereby to terminal 98. The junction 95 of diodes 92 and 93 is connected through lead 96 to terminal 97. In a manner to be described hereinafter terminals 97 and 98 are provided for the purpose of interconnecting a driver unit 13 to the normally closed (NC) rail and center rail, respectively, of a three rail solid state power control system.

In a similar fashion base 68*c* of the second described UJT, i.e., UJT 68 is connected to junction 99 which in turn is connected to lead 100. Lead 100 thus serves to interconnect base 68*c* of UJT 68 to capacitor 101 and to the base 102*a* of transistor 102. Transistor 102 has its emitter 102*b* connected through terminal 103 to previously described lead 42. Further as can be seen in FIG. 4, resistor 104 is connected between leads 42 and 100 by means of terminals 105 and 106, respectively. The collector 102*c* of transistor 102 is connected through junction 107 to a first winding 108*a* of transformer 108. In addition, first winding 108*a* of transformer 108 has connected thereacross between junction 107 and terminal 109, resistor 110 and neon lamp 111 which are serially interconnected. The other side of neon lamp 111 is connected through terminal 109 to lead 88 and therethrough to terminal 89 and lead 50. The second winding 108*b* of transformer 108 has one side connected to diode 112 which in turn is connected through terminal 113 to lead 114 and terminal 115. The other side of second winding 108*b* of transformer 108 is connected through terminal 116 to previously described lead 91 and therethrough to terminal 98. Diode 117 is connected across leads 91 and 114 by terminals 118 and 119, respectively. Also it is to be noted that a lead 120 is connected to junction 107. The function of lead 120 will be more fully described hereinafter in connection with a description of the circuit of FIG. 5. Finally, whereas as set forth in the preceding paragraph, terminals 97 and 98 are provided for the purpose of interconnecting a driver unit 13 to the normally closed (NC) rail and center rail, respectively, of a three rail solid state power control system, terminal 115 serves as a means of interconnecting the driver unit 13 to the third, i.e., the normally open (NO) rail of the three rail power control system.

Turning now to a description of the manner of operation of the circuit of the driver unit 13 depicted in FIG. 4 of the drawing, as briefly set forth previously A.C. line power is applied through input terminals 15 and 16 to the full wave bridge rectifier 18 to form pulsating D.C. which is then applied to the logic control portion of the circuit through resistor 25 and is clipped to trapezoidal shape by the Zener diode 26. Transistor 61 is maintained in the ON state by means of a voltage appearing at the collector 41*a* of transistor 41. No voltage, or very low voltage is at the collector 61*c* of transistor 61 when it is in the ON or conducting condition.

The voltage at the collector 41*a* of transistor 41 is also applied to the emitter 32*c* of the unijunction transistor 32 and the timing capacitor 35. When capacitor 35 charges to the trigger point of the UJT 32 conduction occurs and the capacitor 35 is discharged through UJT 32. The pulse formed by this discharge is coupled to the base 77*a* of transistor 77 through capacitor 76 turning transistor 77 to the ON condition. Since transistor 77 is base biased to neutral through resistor 79, its conduction will last only as long as the duration of the pulse from UJT 32. The transformer 83 associated with transistor 77 is connected between the collector 77*c* of transistor 77 and the high voltage D.C. from the bridge rectifier 18. Paralleled with the primary, i.e., first winding 83*a* of the transformer 83 is a neon lamp 86 which is connected in series with a current limiting resistor 85. When transistor 77 is not in a conducting state, the same voltage is at both ends of the transformer primary winding 83*a* and also across the neon lamp 86 and resistor 85. Thus, there is no current flow. When transistor 77 conducts, a voltage difference is impressed upon the primary 83*a* of the transformer 83 and the neon lamp 86 - resistor 85 combination resulting in a current flow. The change in flux in the primary 83*a* of the transformer 83 is induced into the secondary winding 83*b* forming an output pulse. The neon lamp 86 is also pulsed causing it to glow.

As long as the UJT 32 is being supplied with power through resistor 36 and capacitor 35 is being charged and discharged by the repetitive switching action of the UJT 32, a train of pulses is applied to the output terminal 97 of the driver unit 13. These pulses are directed and shaped by the action of the two diodes 92 and 93, respectively. Thus, it can be seen that with the driver unit 13 connected in a three rail power control system such that the terminals 97 and 98 are connected to the normally closed (NC) and center rails, respectively, of the three rail system, a train of pulses generated by driver unit 13 would be applied through terminal 97 to the NC rail of the system.

Application of control voltage to the so-called "operate" terminal, i.e., terminal 58 of the driver unit 13 causes a change of state of the outputs therefrom as follows. Control voltage which can be derived from either L1 or L2 is divided by resistors 57 and 51, rectified by diode 55, smoothed by capacitor 52, and applied to the base 44*b* of transistor 44. When transistor 44 is turned on by the voltage applied to its base 44*b*, a positive voltage appears at its emitter 44*a* and is applied to the base 41*b* of transistor 41 through resistor 45. Resistor 47 is a load resistor for the emitter 44*a* of transistor 44. Transistor 41 is now turned ON which, in turn, lowers the voltage at its collector 41*a*. The reduction in voltage at this point removes the source charging capacitor 35 and the UJT 32 ceases to generate pulses. At the same time, the voltage applied to the base 61*b* of transistor 61 through resistor 40 is removed turning it OFF. This then allows a voltage potential to appear at the collector 61*c* of transistor 61 which is coupled through resistor 65 to the emitter 68*a* of the second unijunction transistor (UJT) 68 and the timing capacitor 66. A train of pulses is then generated at the base 68*c* of the UJT and is coupled through capacitor 101 to the base 102 a of the power transistor 102.

The operation of transistor 102 is identical to that of transistor 77, previously described. That is, since transistor 102 is base biased to neutral through resistor 104, when transistor 102 is turned ON its conduction will last only as long as the duration of the pulse from UJT 68. The transformer 108 associated with transistor 102 is connected between the collector 102*c* of transistor 102 and the high voltage D.C. from the bridge rectifier 18. Paralleled with the primary, i.e., first winding 108*a* of the transformer 108 is a neon lamp 111 which is connected in series with a current limiting resistor 110. When transistor 102 is not in a conducting state, the same voltage is at both ends of the transformer primary winding 108*a* and also across the neon lamp 111 and resistor 110. Thus, there is no current flow. When transistor 102 conducts, a voltage difference is impressed upon the primary 108*a* of the transformer 108 and the neon lamp 111 - resistor 110 combination resulting in a current flow. The change in flux in the primary 108*a* of the transformer 108 is induced into the secondary winding 108*b* forming an output pulse. The neon lamp 111 is also pulsed causing it to glow.

As long as the UJT 68 is being supplied with power through resistor 65 and capacitor 66 is being charged and discharged by the repetitive switching action of the UJT 68, a train of pulses is applied to the output terminal 115 of the driver unit 13. These pulses are directed and shaped by the action of the two diodes 112 and 117, respectively. It is therefore seen that with the driver unit 13 connected in a three rail power control system as aforedescribed and with terminal 115 connected to the normally open (NO) rail of the system, a train of pulses generated in the driver unit 13 and applied to terminal 115 would also be applied to the NO rail of the system. Removing the input voltage from the "operate" terminal 58 allows the circuitry to return to its normal condition as heretofore described.

One of the features of the circuit of the driver unit 13 depicted in FIG. 4 is that it provides non-overlapping operation of the output circuits so that one output must be OFF before the other output turns ON. This is accomplished by reason that both transistors 41 and 61 must be ON before one can be turned OFF. It is to be remembered that when transistor 41 or transistor 61 is ON, their associated UJT, i.e., UJT 32 and UJT 68, respectively, is not in operation. The use of UJT transistors is not a prime requirement as other means of pulse generation could be utilized such as silicon unilateral switches (SUS) or transistor oscillators with clipped and shaped outputs.

Figure 5:
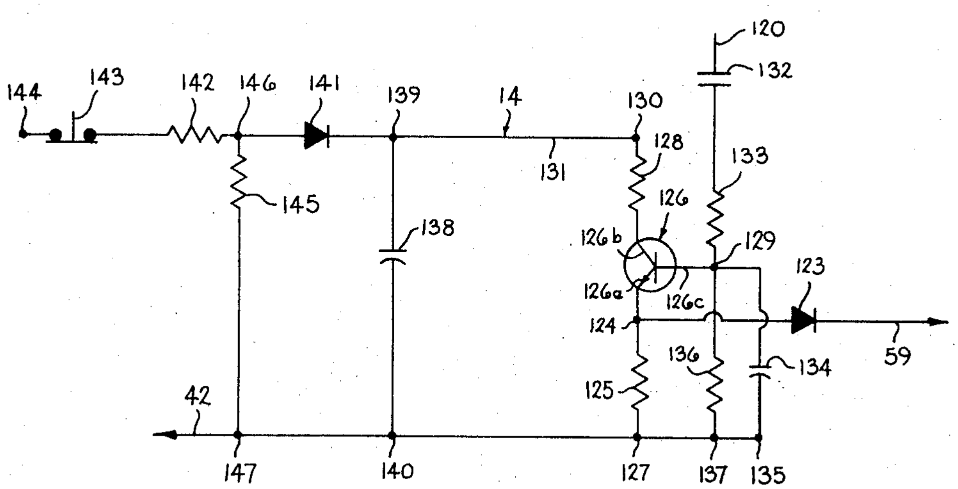
FIG. 5 is a schematic diagram of the electrical latching circuitry for providing an electrically latched driver unit of a solid state unipole relay in accordance with the present invention.

Referring now to FIG. 5 of the drawing and a description of the electrically latched form of driver unit 14, the electrical latching function is achieved by supplying a positive voltage to the "Latching Input" terminal, i.e., lead 59 of the circuit for driver unit 13 illustrated in FIG. 4. For convenience of description and illustration of the circuitry shown in FIG. 5 as well as to facilitate an understanding of the manner of operation thereof, the continuations of leads 42, 59 and 120 of the circuit of FIG. 4 appearing in FIG. 5 have been designated by the same reference numerals employed in FIG. 4, i.e., numerals 42, 59 and 120, respectively. Proceeding therefore with the description of the circuit of FIG. 5, lead 59 is connected to diode 123 and therefrom to junction 124. The junction 124 interconnects resistor 125 and the emitter 126*a* of transistor 126. The other side of resistor 125 is connected through terminal 127 to lead 42. Transistor 126 has its collector 126*b* connected to resistor 128 and its base 126*c* connected to junction 129. The other side of resistor 128 is connected through terminal 130 to lead 131. Previously referred to lead 120 serially connects capacitor 132 and resistor 133 to junction 129. Capacitor 134 is connected between junction 129 and by means of terminal 135 to lead 42, and resistor 136 is also connected to junction 129 and by means of terminal 137 to lead 42. A capacitor 138 is connected across leads 131 and 42 by means of terminals 139 and 140, respectively. Lead 131 further serves to interconnect diode 141, resistor 142, and normally closed contact 143 to terminal 144, which may be connected to A.C. L1 or L2. Finally in accord with the circuit shown in FIG. 5, a resistor 145 is connected across leads 131 and 42 by means of junction 146 and terminal 147, respectively.

Considering next the manner of operation of the circuit of FIG. 5, the positive voltage which is supplied to the "Latching Input" terminal, i.e., lead 59 of FIG. 4, is derived from the additional transistor 126 which has its operating power derived from the power line through a normally closed contact 143, and base drive derived from the pulse train generated at transistor 102, the latter being previously referred to in connection with the description of the circuit of FIG. 4. When operating power is applied to the latching transistor 126, it is ready for operation but is held in a non-conducting state by its base bias resistor 136. When the control unit is operated by momentarily applying power to its so-called "operate" terminal, i.e., terminal 58, a portion of the train of pulses amplified by transistor 102 is applied to the base 126*c* of the latching transistor 126 through capacitor 132 and resistor 133 turning it ON and in turn applying voltage to the base 44*b* of transistor 44 keeping transistor 44 ON and maintaining the balance of the circuit in the actuated state.

Opening the power supply to the collector 126*b* of transistor 126 will remove the output from the emitter 126*a* of transistor 126 that is coupled through diode 123 to the latching input to the base 44*b* of transistor 44. This will allow transistor 44 to turn OFF and, in turn, remove the train of pulses appearing at the collector 102*c* of transistor 102. Since the train of pulses delivered to the base 126*c* of transistor 126 is not continuous, because it is controlled by the trapezoidal wave form of the power supply, a timing capacitor 134 is provided connected to the base 126*c* of transistor 126 to keep the base current flowing until the next portion of the pulse train occurs.

Figure 3:
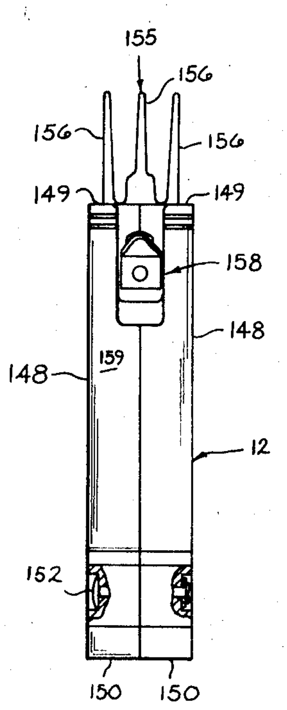
FIG. 3 is a side view of the power pole of FIG. 2 of a solid state unipole relay in accordance with the present invention.
Figure 2:
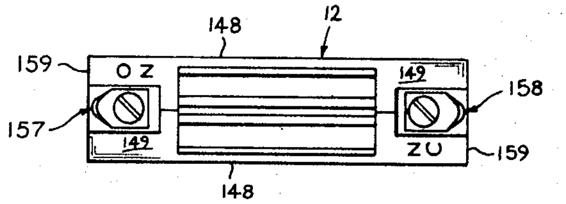
FIG. 2 is a top view of the power pole of FIG. 1 of a solid state unipole relay for use in a modular, solid state, power control system in accordance with the present invention.

The other of the two discrete elements comprising the solid state unipole relay in accordance with the present invention is the power pole 12 illustrated in FIGS. 1, 2, 3 and 6 of the drawing. The structural details of the power pole 12 will only briefly be set forth hereinafter in connection with a description of FIGS. 1–3 of the drawing inasmuch as such details constitute a portion of my invention which is the subject matter of another patent application filed concurrently herewith, and which is assigned to the same assignee as the present invention. With reference to FIGS. 1–3, the power pole 12 illustrated therein is preferably of two-part construction. Each of the two parts is of substantially identical configuration, and each includes an end wall 148, top and bottom walls 149 and 150, respectively, and an open side 151. The two parts are preferably fastened together by means of a plurality of rivets 152 (only one shown) received in openings 153 suitably provided for this purpose in end walls 148. When joined together in the aforesaid manner, the two parts provide a power pole 12 having a hollow interior 154 in which are housed the circuit components of the power pole 12. These circuit components will be referred to more fully hereinafter in connection with a description of the circuit for power pole 12 depicted in FIG. 6 of the drawing.

Referring further to FIG. 1 and 2 of the drawing, the power pole 12 is provided with a heat sink 155 extending outwardly through top walls 149. The heat sink 155 as best seen with reference to FIG. 2 comprises a plurality of outwardly extending fins 156. In accordance with the preferred embodiment of the invention the heat sink 155 of power pole 12 includes three such fins 156. It is to be understood however that the heat sink 155 may include more or fewer fins 156 without departing from the essence of the invention. The important consideration in this regard is that the heat sink 155 have sufficient heat dissipation capacity to dissipate the heat generated by the circuit components housed in the interior 154 of power pole 12. A pair of externally accessible screw type terminals 157, 158 are provided in opposing walls 159 of the power pole 12. As seen with reference to FIG. 1 of the drawing, the terminals 157, 158 are located in closely spaced relation to the top walls 149 of power pole 12. Extending outwardly from the bottom walls 150 of power pole 12 are a pair of pin type terminals 160, 161. The latter terminals 160, 161 are intended to be inserted into two of the rails of the three rail solid state power control system referred to previously hereinabove in connection with the description of the driver unit 13. Depending on the way the pin terminals 160, 161 of power pole 12 are inserted into the aforementioned rails, the power pole 12 will be provided with either normally open (NO) or normally closed (NC) operation. This is because each power pole 12 associated with a driver unit 13 is wired identically.

Figure 6:
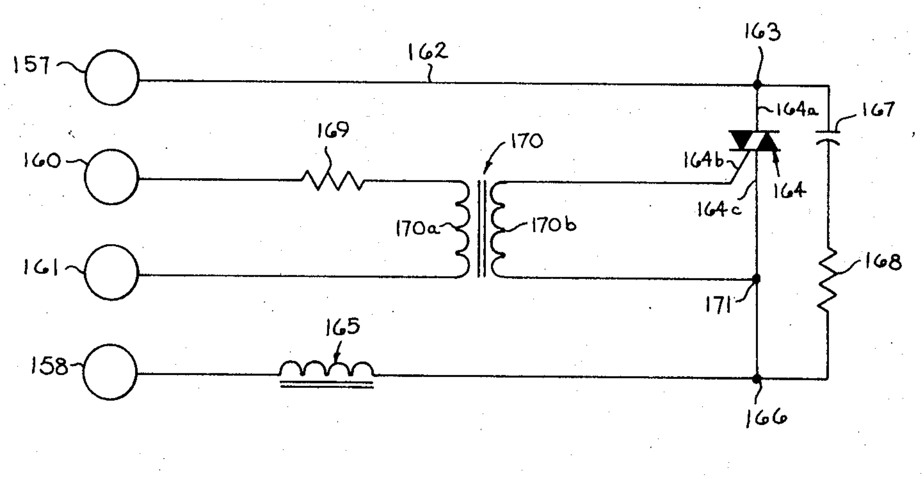
FIG. 6 is a schematic diagram of the circuitry of the power pole illustrated in FIG. 1 of a solid state unipole relay in accordance with the present invention.

Referring now to FIG. 6 of the drawing, in accordance with the preferred embodiment of the invention the circuit of power pole 12 as illustrated therein includes the two screw type terminals 157, 158 referred to in the preceding paragraph as well as the two pin type terminals 160, 161 also referred to therein. Terminal 157 is connected by lead 162 to terminal 163 which in turn is connected to one terminal 164*a* of Triac 164. Terminal 158 is connected to inductor 165 and to terminal 166. Serially connected capacitor 167 and resistor 168 are connected across Triac 164 by means of terminals 163 and 166. Terminal 160 is connected through resistor 169 to one side of first winding 170*a* of pulse transformer 170, and terminal 161 is connected to the other side thereof. One side of second winding 170*b* of pulse transformer 170 is connected to the gate 164*b* of Triac 164, while the other side of second winding 170*b* is connected to junction 171 to which the other terminal 164*c* of Triac 164 is connected. It is also contemplated that the power pole 14 may include without departing from the essence of the invention SCR circuitry for controlling DC loads.

Proceeding with a description of the mode of operation of the circuit of power pole 12 as depicted in FIG. 6, the two contact pins 160, 161 of power pole 12 are inserted into two rails of a three rail solid state power control system to which a driver unit 13 has been connected. As noted above, the pins, i.e., terminal 160, 161 are connected to the first winding 170*a* of pulse transformer 170, with the connection from terminal 160 being through the current limiting resistor 169. The Triac 164 has a DV/DT network comprised of capacitor 167 and resistor 168 connected across it and one power terminal 164*c* is attached to load terminal 158 through surge limiting inductor 165 and the other power terminal 164*a* is attached to the line through terminal 157. In operation, the train of pulses generated by the driver unit 13 or 14 depending upon which form of driver unit 11 is being employed is applied to either the N.C. rail through terminal 97 or the N.O. rail through terminal 115 of the mounting track in which the aforesaid rails are housed. When a power pole 12 is affixed to this track, its terminals 161 and 160 connect respectively to the center or ground rail and one of the other rails, i.e., the N.C. or the N.O. rail. If the particular rail, i.e., the N.C. or the N.O. rail is energized by the pulse train, the pulse transformer 170 in the power pole 12 is energized and couples gate pulses to the Triac 164 causing it to go into conduction between the line and load terminals 157 and 158, respectively.

Thus, in accordance with the present invention there has been provided a novel and improved solid state unipole relay for use in solid state power control systems which relay incorporates a building block approach whereby combinations of relay elements may be combined to form multipole relays having convertible contact functions. Further in accordance with the present invention multipole relays are capable of being provided having a greater number of poles than the number heretofore possessed by prior art solid state relay devices. In addition the solid state unipole relay of the present invention is capable of carrying higher currents than carried by prior art solid state relay devices. Moreover the subject solid state unipole relay by being capable of operating from either side of the line facilitates applying the relay in a given application. Also it is to be noted that the solid state unipole relay of the present invention embodies the capability of providing a third logic sequence. Finally, the solid state unipole relay of the instant invention is relatively easy to manufacture and assemble while yet providing long life and reliability in operation.

While only one embodiment of my invention has been shown, it will be appreciated that modifications thereof may readily be made therein by those skilled in the art. For example, as pointed out herein previously, other means of pulse generation such as silicon unilateral switches or transistor oscillators with clipped and shaped outputs may be substituted for the UJT 32 and UJT 68 in the circuit of the driver unit 13. I therefore intend by the appended claims to cover the above modifications as well as all other modifications which fall within the true spirit and scope of my invention.

What I claim as new and desire to secure by Letters Patent of the United States is:

1. A solid state unipole relay comprising:

a. a first unit having at least first, second and third output terminals, and a control voltage input terminal for receiving a control voltage input signal;

b. said first unit further including pulse generating means for generating a first train of output pulses and a second train of output pulses, and latching means electrically connected to said pulse generating means;

c. said pulse generating means including a first transistor having an ON and an OFF condition, a first pair of solid state electronic devices each having an ON and an OFF condition, a second pair of solid state electronic devices each having an ON and an OFF condition, and circuit means interconnecting said first transistor and said first and second pairs of solid state electronic devices in circuit;

d. said pulse generating means having a first state of operation wherein said first transistor is in said OFF condition, one of said first pair of solid state electronic devices is in said OFF condition, and the other of said first pair of solid state electronic devices is switching between said OFF and said ON condition such that said first train of output pulses is supplied from said other of said first pair of solid state electronic devices between said first and third output terminals;

e. said pulse generating means having a second state of operation wherein said first transistor is in said ON condition, one of said second pair of solid state electronic devices is in said OFF condition, and the other of said second pair of solid state electronic devices is switching between said OFF and said ON condition such that said second train of output pulses is supplied from said other of said second pair of solid state electronic devices between said second and third output terminals;

f. said pulse generating means changing from said first state of operation wherein said first train of output pulses is supplied to said first output terminal to said second state of operation wherein said second train of output pulses is supplied to said second output terminal in response to said control voltage input signal being applied to said control voltage input terminal to cause said first transistor to go from said OFF condition to said ON condition and energize said relay, whereby said latching means holds said relay in the energized condition after said control voltage signal is extinguished; and g. at least one discrete second unit having a solid state electronic switching device, said switch device having an ON and an OFF condition, said second unit alternately electrically connectable between said first and third terminals of said first unit for receiving said first train of pulses and said second and third terminals of said first unit for receiving said second train of pulses, whereby when said second unit is electrically connected to said first and third terminals said switching device is in the ON condition until said relay is energized and said relay is connected in a normally closed mode, and when said second unit is electrically connected to said second and third terminals said switching device is in said OFF condition until said relay is energized and said relay is connected in a normally open mode.

2. A solid state unipole relay as set forth in claim 1 wherein:

a. said first unit further includes a pair of input terminals for connection to an alternating current source; and b. said first train of output pulses and said second train of output pulses are alternatively generated by said pulse generating means.

3. A solid state unipole relay as set forth in claim 1 wherein:

a. said first unit further includes a first light means connected in circuit with said first output terminal, said first light means being illuminated when said first train of output pulses is supplied to said first output terminal;

b. said one of said first pair of solid state electronic devices comprises a transistor; and c. said other of said first pair of solid state electronic devices comprises a unijunction transistor.

4. A solid state unipole relay as set forth in claim 3 wherein:

a. said first unit further includes a second light means connected in circuit with said second output terminal, said second light means being illuminated when said second train of output pulses is supplied to said second output terminal;

b. said one of said second pair of solid state electronic devices comprises a transistor; and c. said other of said second pair of solid state electronic devices comprises a unijunction transistor.

5. A solid state unipole relay as set forth in claim 1 wherein said latching means further includes a. means for receiving said second train of pulses and converting said second train of pulses to a DC level; and b. means for electrically coupling said DC level to the input of said first transistor to hold said first transistor in the ON condition and thereby keep said relay in the energized condition after said control signal is extinguished.

6. A solid state unipole relay comprising:

a. a first unit having at least first, second and third output terminals, and a control voltage input terminal for receiving a control voltage input signal;

b. said first unit further including pulse generating means for generating a first train of output pulses and a second train of output pulses, said pulse generating means having a first state of operation and a second state of operation;

c. said pulse generating means changing from said first state of operation wherein said first train of output pulses is supplied between said first and third output terminals to said second state of operation wherein said second train of output pulses is supplied between said second and third output terminals in response to said control voltage input signal being applied to said control voltage input terminal to cause said relay to go from a deenergized to an energized condition; and d. at least one second unit alternately electrically connectable between said first and third terminals of said first unit for receiving said first train of output pulses and second and third terminals of said first unit for receiving said second train of output pulses, said second unit including a pulse transformer, an electronic solid state switching device having an ON and an OFF condition, and circuit means interconnecting said pulse transformer and said switching device in circuit with said first unit whereby when said second unit is electrically connected to said first and third terminals said switching device is in the ON condition until said relay is energized and said relay is connected in a normally closed mode, and when said second unit is electrically connected to said second and third terminals said switching device is in said OFF condition until said relay is energized and said relay is connected in a normally open mode.

7. A solid state unipole relay as set forth in claim 6 wherein:

a. said pulse generating means of said first unit includes a first transistor having an ON and an OFF condition, a first pair of solid state electronic devices each having an ON and an OFF condition, a second pair of solid state electronic devices each having an ON and an OFF condition, and circuit means interconnecting said first transistor and said first and second pairs of solid state electronic devices in circuit;

b. said one of said first pair of solid state electronic devices comprises a transistor;

c. said other of said first pair of said solid state electronic devices comprises a unijunction transistor; and d. said first unit further includes a first light means connected in circuit with said first output terminal, said first light means being illuminated when said first train of input pulses is supplied to said first output terminal.

8. A solid state unipole relay as set forth in claim 7 wherein:

a. said first unit further includes a second light means connected in circuit with said second output terminal, said second light means being illuminated when said second train of output pulses is supplied to said second output terminals;

b. said one of said second pair of solid state electronic devices comprises a transistor; and c. said other of said second pair of solid state electronic devices comprises a unijunction transistor.

9. A solid state unipole relay as set forth in claim 6 further comprising:

a. electrical latching means connected in circuit with said pulse generating means of said first unit, said electrical latching means having an unactuated and an actuated condition;

b. said electrical latching means changing from said unactuated condition to said actuated condition in response to said control voltage input signal being applied to said control voltage input terminal of said first unit; and c. said electrical latching means when in said actuated condition latching said first transistor in said ON condition.

* * * * *